US006639982B1

(12) United States Patent
Stuart et al.

(10) Patent No.: US 6,639,982 B1
(45) Date of Patent: *Oct. 28, 2003

(54) METHOD AND APPARATUS FOR AGENT FORCING AND CALL DISTRIBUTION FOR LARGE TEAM CALL SERVICING

(75) Inventors: Robert Oden Stuart, Indianapolis, IN (US); Scott Patterson Stuart, Atlanta, GA (US); Robert Oden Stuart, II, San Diego, CA (US)

(73) Assignee: Six Sigma, Inc., Indianapolis, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/636,056

(22) Filed: Aug. 10, 2000

Related U.S. Application Data

(60) Provisional application No. 60/148,598, filed on Aug. 12, 1999.

(51) Int. Cl.[7] .................................................. H04M 3/00
(52) U.S. Cl. .......................... 379/266.03; 379/265.14; 379/265.11; 379/265.01; 379/265.02
(58) Field of Search ................................ 379/265, 266, 379/309

(56) References Cited

U.S. PATENT DOCUMENTS

| | | | |
|---|---|---|---|
| 4,163,124 A | * | 7/1979 | Jolissaint ............... 379/266.01 |
| 4,345,116 A | | 8/1982 | Ash et al. |
| 4,408,100 A | | 10/1983 | Pritz et al. |
| 4,951,310 A | * | 8/1990 | Honda et al. ............... 379/266 |
| 4,953,204 A | | 8/1990 | Cuschleg, Jr. et al. |
| 5,025,468 A | * | 6/1991 | Sikand et al. ................. 379/67 |
| 5,062,103 A | | 10/1991 | Davidson et al. |
| 5,185,780 A | | 2/1993 | Leggett |
| 5,206,903 A | | 4/1993 | Kohler et al. |
| 5,212,691 A | | 5/1993 | Hokari |
| 5,249,223 A | | 9/1993 | Vanacore |
| 5,299,260 A | | 3/1994 | Shaio |
| 5,465,286 A | | 11/1995 | Clare et al. |
| 5,506,898 A | * | 4/1996 | Costantini et al. .......... 379/266 |
| 5,519,773 A | * | 5/1996 | Dumas et al. ......... 379/265.05 |
| 5,530,744 A | | 6/1996 | Charalambous et al. |
| 5,570,419 A | * | 10/1996 | Cave et al. .................. 379/111 |
| 5,586,179 A | * | 12/1996 | Stent et al. .................. 379/265 |
| 5,590,188 A | | 12/1996 | Crockett |
| 5,592,542 A | * | 1/1997 | Honda et al. ................ 379/265 |
| 5,646,987 A | | 7/1997 | Gerber et al. |
| 5,652,791 A | * | 7/1997 | Sunderman et al. ... 379/265.03 |
| 5,684,872 A | | 11/1997 | Flockhart et al. |
| 5,724,419 A | | 3/1998 | Harbuziuk et al. |
| 5,740,238 A | | 4/1998 | Flockhart et al. |
| 5,754,639 A | | 5/1998 | Flockhart et al. |
| 5,768,360 A | * | 6/1998 | Reynolds et al. ........... 379/220 |

(List continued on next page.)

*Primary Examiner*—Ahmad F. Matar
*Assistant Examiner*—Hector Agdeppa
(74) *Attorney, Agent, or Firm*—Liell & McNeil

(57) ABSTRACT

The present invention finds particular applicability for use with large call centers. Force managers are continuously searching for ways to increase the efficiency of their agents. In response to this need, the present invention provides a method of dynamically adjusting work force configuration, such as number of call teams, number of call agents in each call team, and identity of the agents in the call teams, to maintain a desired level of performance and efficiency, as determined by the force managers. To perform this task, an apparatus according to the present invention includes a methodology for monitoring call data, force management variables and performance data, throughout operation of the call center. In addition, the apparatus includes a method for adjusting the workforce configuration in response to the results of the monitoring.

3 Claims, 6 Drawing Sheets

System Schematic

U.S. PATENT DOCUMENTS

| | | |
|---|---|---|
| 5,784,452 A | 7/1998 | Carney |
| 5,828,747 A | 10/1998 | Fisher et al. |
| 5,857,018 A | 1/1999 | Sumner et al. |
| 5,864,617 A | 1/1999 | Donnelly |
| 5,915,010 A * | 6/1999 | McCalmont ................. 379/212 |
| 5,987,117 A * | 11/1999 | McNeil et al. ............... 379/265 |
| 6,038,544 A * | 3/2000 | Machin et al. ................. 705/11 |
| 6,058,435 A * | 5/2000 | Sassin et al. ................ 709/305 |
| 6,163,607 A * | 12/2000 | Bogart et al. ................ 379/266 |
| 6,198,739 B1 * | 3/2001 | Neyman et al. ............. 370/353 |
| 6,205,412 B1 * | 3/2001 | Barskiy et al. ................ 703/13 |

* cited by examiner

System Schematic

Workforce Configuration Aspect

US 6,639,982 B1

METHOD AND APPARATUS FOR AGENT FORCING AND CALL DISTRIBUTION FOR LARGE TEAM CALL SERVICING

RELATION TO OTHER APPLICATION

This application claims priority from pending provisional application 60/148,598, filed Aug. 12, 1999, with the same title for any commonly disclosed subject matter.

TECHNICAL FIELD

This invention relates generally to telecommunications systems and more specifically, to methods and systems for dynamically forcing and distributing calls to agents within large team call servicing centers.

BACKGROUND ART

Force management systems for large team call servicing centers are well known in the prior art. These systems forecast the required number of call handling agents to handle the anticipated call volume as well as distribute calls to the call handling agents in some predetermined manner.

In determining the required number of agents to handle the anticipated call volume, call centers rely primarily on two variables: the estimated, or offered, load and grade of service. The offered load is a unit of measurement reflecting the estimated total work time of the incoming call traffic and is calculated by multiplying the estimated number of calls within a certain time period by the estimated average work time for those calls. In estimating the number of calls, current force management systems typically utilize time-series analyses of historic data as well as current telephone switch monitored data to forecast the number of incoming calls for a particular time period. Once the offered load is calculated, the number of agents required to service this specific load is determined. Typically, further adjustments are made to the number of agents working within a particular period of time as force managers evaluate the previous time period's results as well as the trends for the day. In U.S. Pat. No. 5,185,780 to Leggett a method for predicting the required number of agents required to provide a given service level in a force management system is taught. Under this method, the force management system generates call handling performance data from which an offered load is calculated. Using this offered load value, the method calculates predictor values and uses these values in successive Erlang C calculations to locate the desired number of agents required to provide a given service level.

As the Leggett invention teaches, present call center force management systems attempt to match the appropriate number of agents with the estimated offered load to ensure that some predetermined acceptable level of service is achieved. There are many parameters by which the level, or grade, of service to the calling customer may be evaluated. However, the two most typical measurements include average delay in queue ("average delay") and percent abandon. Average delay refers to the length of time a caller must wait in queue before the caller is connected to an agent position. Percent abandon refers to the percentage of callers who abandon their efforts to seek agent assistance. Understandably, there is a very strong correlation between average delay and percent abandon.

Another aspect of the agent staffing function that critically affects the ability to manage service levels is the agent work force configuration. Current state of the art utilizes a single, large team approach that allows any incoming call to reach any call agent Under this approach, the offered load must be calculated for each distinct period of time and management must schedule a corresponding single, large team of agents to meet this offered load while providing a predetermined service level. An example of the range of agent team size necessary to try to meet the offered load demonstrates the wide variability in team size throughout a twenty-four hour period. In one specific type of large team call center, telephone directory assistance, team sizes may range from as few as 30 call agents in the early morning hours to as many as 250 agents and more during the peak busy hours.

Under the single, large team methodology, management may need to make adjustments to the large agent team when service reaches some critical level by scheduling one or more additional agents. For example, when the offered load exceeds the carried load for a particular increment of time, e.g. 15 minutes, 30 minutes, etc., the result is a degradation in service. When service is degraded, the average delay and the percent abandons both increase in some concomitant manner. This percent abandon value may be as high as 20–50% for some quarter hour intervals. Typically, management this agent workforce adjustment by monitoring and evaluating the results of a particular time period for a service degradation, deciding how best to manage the service degradation, and finally arranging for additional agent resources, if needed, by calling in additional agents or offering overtime to those agents presently on duty. It is important to note that no existing force management system is capable of making dynamic adjustments to agent team size in real-time.

In addition to estimating the required number of agents, current force management systems distribute calls to the agents in some predetermined manner. Typically, calls are distributed by an automatic call distributor (ACD) to one of a plurality of call agents based on some predetermined notion of "fairness." For example, in U.S. Pat. No. 5,828, 747 to Fisher, et al. a call distribution methodology is taught based on an individual agent's occupancy. Call occupancy refers to the amount of time that an agent spends on actually handling calls and is typically expressed as a percentage of the total amount of time the agent has been available to handle a call. Under the Fisher methodology, individual agent occupancies are calculated and a queue of available agents is ordered in the inverse order of the agents occupancies. Calls are distributed to the agents in the inverse order of their individual agent occupancies specifically to improve the equity of the call distribution.

Other call distribution methodologies based on some notion of "fairness" include the distribution of calls to an agent who has been idle the longest or the distribution of calls to an agent to ensure that all agents handle an equal number of calls. Idle time re-refers to that period of time in which the agent is not handling a call or performing a call related task. Lastly, other call distribution methodologies include distributing calls based on a caller's originating number or geographic location.

Current force management systems may also attempt to perform the agent forcing and call distribution function in some cost-optimizing manner. Call centers often attempt to strike a balance between satisfying the grade of service objectives and minimizing the agent variable costs. When the offered load exceeds the carried load, the call volume that is actually being handled by the call agents, service is degraded and customers abandon their efforts to seek assistance from an agent. The percent abandon increases and service may be significantly degraded. Moreover, this increase in the number of callers who abandon their calling efforts results in a portion of these same callers attempting to seek agent assistance again. These regenerated attempts are not random and cause the offered load to further increase exponentially, thereby exacerbating the percent abandon service problem. Conversely, when the offered load is less than the carried load, agents are idle, resulting in an inefficient use of labor. Neither of these conditions results in optimal performance. An increasing percentage of abandoned calls indicates customer dissatisfaction with the company; correspondingly, reducing the percentage of abandoned calls by increasing the number of available agents may drive up cost beyond an optimal level.

In addition to minimizing agent cost, current methodologies may attempt to optimize agent utility either by distributing calls to an agent with a particular skill or by utilizing an agent's idle time to perform tasks other than the handling of calls. U.S. Pat. No. 5,206,903 to Kohler et al. teaches an automatic call distribution in which each incoming call, with each call having been assigned up to three prioritized skill numbers, attempts to be matched with an agent possessing that particular skill. Each agent possesses up to tour skill numbers representing various particular abilities of the agent and agents are arranged in static groups relating to the particular skills each agent possesses. Upon the arrival of the incoming call, a search is made for a match between the caller skill number and an available agent possessing that skill. This search is conducted sequentially, with a search being conducted on the first skill number before a search is conducted on the either the second or third skill number. Finally, if no match is found with any one of the skill numbers, the search of available agents is expanded to other groups of agents.

There are a number of other reasons why average delay may exceed the stated service objective in addition to a particular call distribution methodology. Among the most important are the following. First, the calls that arrive are not random. A call center may experience call volume "peaks" at certain non-random times. For example, calls often arrive a few minutes or seconds after the hour or half hour due to television commercial breaks. If calls are delayed because of a two or three minute problem, the force data management systems currently used would be unable to detect it. These current systems look only at a thirty second delay during a fifteen minute period and determine from that if additional operators are needed.

A second factor may be agent practice. An agent often may leave a position a few minutes early or occupy a position a few minutes late. Additionally, an agent may place the position in a "make-busy" state or take a short relief, temporarily making the agent unavailable to handle calls. Although the calls arrive as forecasted, these agent practices effectively reduce the number of available agents for short periods of time. In addition to specific agent work practices, an agent's ability to handle calls within an estimated average work time (AWT) may significantly impact the average delay. A new or inexperienced agent as well as the introduction of a new operating practice to experienced agents may cause an agent to handle calls more slowly than anticipated. For example, some operators may have an AWT of five minutes for a few calls in contrast to the normal AWT of thirty seconds. This increased AWT means that an agent is not able to handle as many calls as estimated. In addition, when operators release a lower percentage of their calls to the audio response unit (ARU) than desired, AWT will increase, thus causing a rise in average delay.

Another factor that can contribute to average delay exceeding the objective is actual offered load. It should be appreciated that when offered load exceeds the estimated load, either because AWTs are higher or lower than expected or because the volume of incoming calls is higher than expected, this will contribute to a higher average delay. Additionally, when all positions are occupied, a position shortage can occur which can drive up the average delay. Further, equipment problems, such as out of service positions or excessive/slow log in time, and network problems, such as regenerated attempts, can also cause the average delay to be increased.

In contrast to a call distribution methodology based on a single, large team, call routing utilizes fundamental network engineering principles to route calls over a complex, tiered telecommunications network. Call routing refers to sending a call from the originating location to the final destination over a telecommunications network composed of telephone switches and telephone trunk lines. The fundamental network engineering principle used to design this complex network is that a number of smaller direct trunk groups between two points is far less efficient than fewer, larger, more efficient trunk groups with an overflow response capability. By concentrating the originating call volume into larger, more efficient trunk groups these trunk groups are able to operate at a much higher percent occupancy.

This increase in network efficiency is achieved by creating a hierarchical, or tiered, trunking arrangement. Under this arrangement, all calls are first offered to one or more high usage ("HU") trunk groups. These HU trunks receive random traffic or calls and are engineered to operate at near 100% occupancy. This maximum occupancy is accomplished by offering much more traffic to the HU trunks than the HU trunks can carry. The call traffic that the HU trunks are not able to carry overflows to a second level of trunks, the alternate route ("AR") trunk groups.

AR trunk groups handle traffic that is not random. Rather, the AR trunks receive calls that have overflowed from multiple HU trunk groups. Alternate trunk groups also run at high occupancy levels, often at the 90 percent and greater levels during peak periods. As with the HU trunks, these AR trunk groups are also designed to overflow to final trunk groups. These final trunk groups are designed to receive peak load calls and are engineered to operate at a predetermined service level. The result of this complex network is that large, highly efficient HU and AR trunk groups complete most of the calls with final trunk groups completing the remaining calls. As an example of the gains in efficiency obtained under this network methodology, a single large combined trunk group might require 300 individual trunks, but by dividing trunks into tiered trunk groups, i.e. high usage trunk groups, alternate trunk groups, and final trunk groups, the total number of trunk circuits is reduced to 250 or less, an almost 17%, reduction.

DISCLOSURE OF THE INVENTION

One object of the present invention is to provide a method and apparatus for dynamically matching carried load with the incoming call traffic offered load.

Another object of the present invention is to provide a method and apparatus for dynamically determining an enhanced, hierarchical, agent work force team configuration at any given point in time, utilizing the optimization techniques of the present invention.

Another object of the present invention is to provide a method and apparatus for distributing calls to a plurality of agents in a manner that improves agent variable costs.

Another object of the present invention is to provide a method and apparatus for dynamically determining a threshold delay between various pairs of agent teams to provide a predetermined grade of service at any given point in time.

Another object of the present invention is to provide a method and apparatus for improving the management and quality of service provided to customers seeking agent assistance.

Yet another object of the present invention is to provide a method and apparatus for improving agent call occupancy utilizing novel optimization techniques.

Still another object of the present invention is to provide a method and apparatus for minimizing the cost of an agent work force by utilizing idle time in a last or final team productively for training or education.

In accordance with the stated objectives, in one aspect of the present invention, a method of distributing calls to a plurality of agents comprises the step of assigning each of the plurality of agents to one of a plurality of teams. The plurality of teams are configured into a hierarchy that includes at least a primary team and a final team. At least a portion of the incoming calls are initially distributed to the primary team. A call is redistributed according to the hierarchy from the primary team toward the final team if the call is not answered by an agent of the primary team within a predetermined period of time.

In another aspect of the present invention, a call management system comprises a means for configuring a plurality of agents into a plurality of teams with a hierarchical structure. Also included are a means for delaying a majority of incoming calls a predetermined period of time and a means for monitoring call handling data, force management variables and performance data. A means for adjusting in real time at least one of team configuration and the predetermined period of time is also included.

In yet another aspect of the present invention, an article comprises a computer-readable data storage medium. A means is recorded on the medium for determining a call delay time period and a configuration of agents into a hierarchy of teams as a function of the call data, the force management variables and the performance data.

DETAILED DISCLOSURE OF THE INVENTION

In accordance with the stated objectives, the present invention provides a method and apparatus to maximize productivity of handling incoming call traffic while managing agent cost or agent skill at some predetermined service level utilizing optimization techniques. This productivity improvement is achieved through real-time, dynamic, control of threshold delays between multiple teams and a determination of the most favorable configuration of the agent work force within each of these teams, as determined by the system manager. The invention utilizes a hierarchical, multi-team methodology in conjunction with a client-server apparatus operational with a telecommunications server to dynamically adjust agent team size and function in order to match offered load with carried load in an improved manner. Further, this invention utilizes a computer to perform real time monitoring, analyzing and adjusting of force management variables, call data and performance data.

Figure 1:
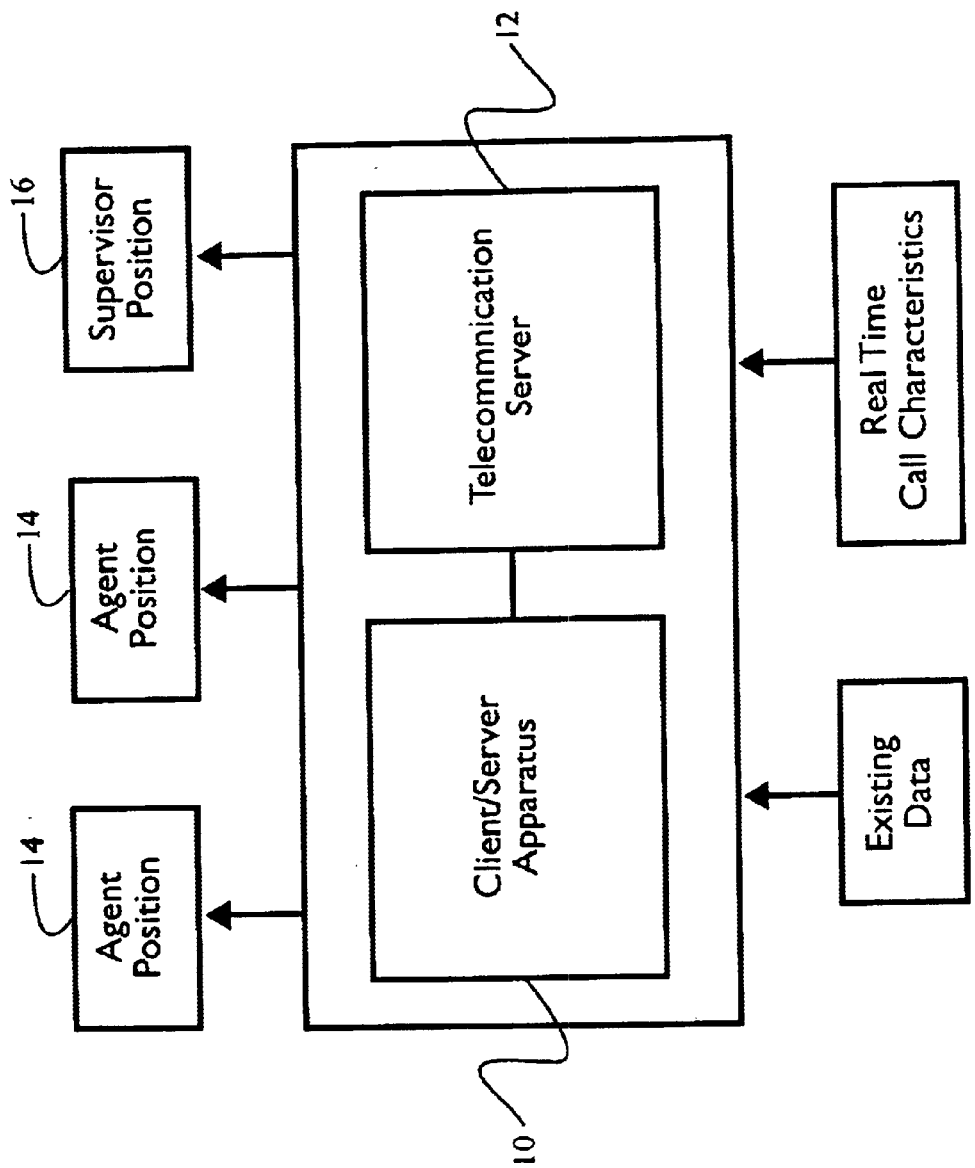
FIG. 1 is a schematic representation of the apparatus of the present invention.

Referring now to FIG. 1, the invention is comprised of the following components. First, the invention utilizes a client/server apparatus 10 ("apparatus") operational with a telecommunications server 12, including a telephonic switch, such as an automatic call distributor ("ACD"), to monitor various aspects of the call related data. Additionally, apparatus 10 may be comprised of a processor, memory storage disks, input/output devices and communications interface equipment. In a preferred embodiment of the invention, the apparatus is coupled directly to communications server 12 and receives or monitors the call data in real time. It is important to note, however, that the invention may also operate by being linked to communications server 12 in any fashion capable of transporting data from communications server 12 to apparatus 10. Additionally, apparatus 10 is also capable of receiving call data from the switch in modes other than in real time, e.g. in periodic increments of time, such as every fifteen minutes.

Preferably, apparatus 10 includes a computer-readable data storage medium that provides a means recorded on the medium for obtaining call data, force management variables and performance data. A means for determining a call delay time period and a configuration of agents into a hierarchy of teams as a function of the call data, force management variables and performance data is also preferably recorded on the storage medium. In addition, a means for determining expected performance data for a plurality of different team configurations and call delay time periods is also preferably recorded on the medium. A means for generating commands to control an automatic call distributor is recorded on the medium, as well as a means for recording call data, force management variables and performance data. Each of these elements of apparatus 10 will be further described in relation to the method of the present invention.

Apparatus 10 and communications server 12 are linked to a plurality of agent positions 14. Agent positions 14 may include a video display terminal, a keyboard, speakers & microphone, a voice recognition unit, among other features typical of agent call handling workstations. One or more supervisor workstations 16 may also be associated with the system. Additionally, the invention is operational with existing force management databases and systems 18 and receives input such as real time call characteristics 20. As an example, the invention may need to gather types of data other than call server related data, such as budgetary data, among other types of data. Finally, the invention is also operational for geographically dispersed call handling agents.

In a preferred embodiment, apparatus 10 is comprised of at least the following components, including an input means, a monitoring means, a control means, a work force configuration means, a call distribution means, and an enhancement means. Those skilled in the art will recognize that the first three components of the invention are typical of many types of client/server apparatuses that control or manage a particular process. Specifically, the input means is capable of receiving input from multiple sources, including management-specified criteria relating to the operation of the invention. The monitoring means is preferably operational with the telecommunications server, including a telephonic switch, such as an ACD, and monitors all call-related server data as well as all individual agent terminals. The monitoring means is preferably capable of monitoring and recording not only call data, but also force management variables and performance data, as will be described herein. The control means functions as the primary en abler of decisions made by the invention. In other words, the control means allows the present invention to make any decisions and implement corrective actions without the input of a force manager. However, it should be appreciated that these decisions are based on force management variables for such considerations as service and cost that have been provided as input by the force manager. It should further be appreciated that the present invention contemplates allowing a manager to make changes to various system configurations, in effect overriding or supplementing decisions made by the present system.

The apparatus 10 of the present invention has the capability of performing complicated mathematical algorithms. Furthermore, apparatus 10 includes an enhancement means that utilizes optimization techniques to manipulate any number of mathematical relationships, or optimization algorithms, among any different number of force management variables. Moreover, apparatus 10 works with the communications server to distribute calls according to the parameters established by the enhancement means.

Apparatus 10 utilizes the method of the present invention to achieve the goals of the desired objectives, stated above. In order to present the information in as clear a manner as possible, the method will be discussed in terms of three distinct, but interrelated aspects. Each aspect of the method will further be discussed in terms of both the specific functions associated with that particular aspect of the method as well as the specific components of the apparatus necessary to effectuate those functions of that particular aspect.

The method of the present invention possesses at least three distinct and unique, but interrelated aspects, including an agent work force configuration aspect, a call distribution aspect, and an enhancement aspect. Although each aspect of this invention operates in conjunction with the remaining aspects, each of these aspects will be discussed separately in terms of that aspect's primary functionality. In addition to primary functionality, both the agent work force configuration aspect and the call distribution aspect will be discussed in terms of the key decision variables used in the enhancement process. Finally, after each aspect has been discussed, a step by step example of how the invention may operate demonstrates the interfunctionality of the separate aspects.

Figure 2:
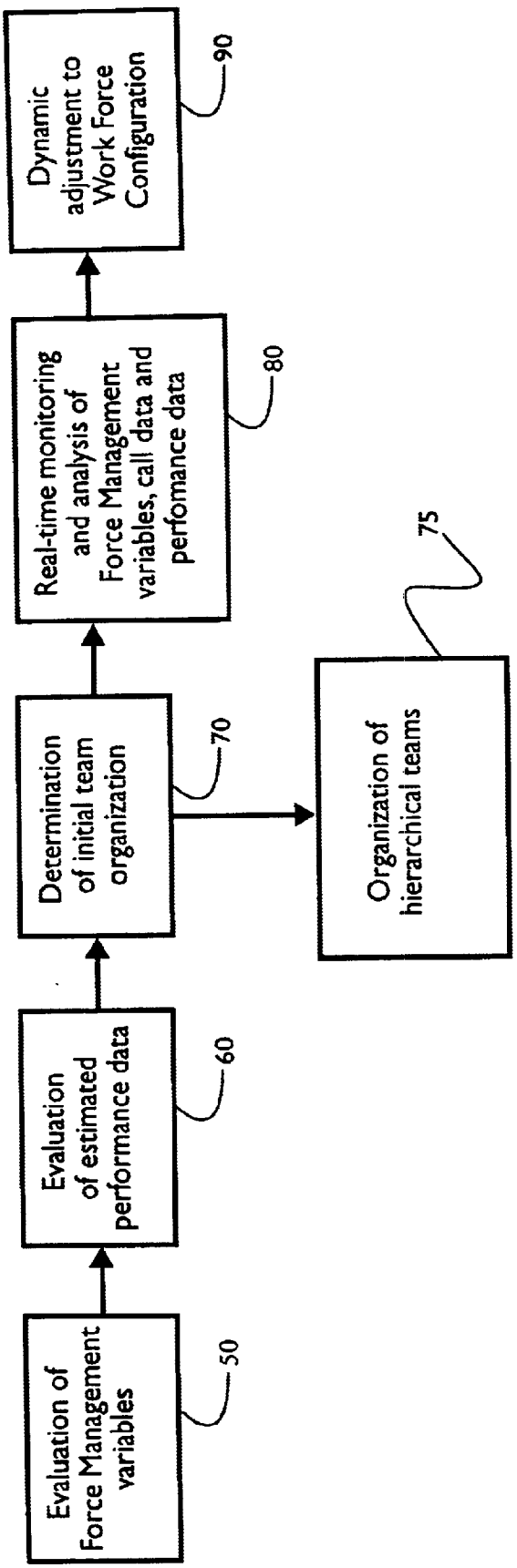
FIG. 2 is a flow chart of the work force configuration aspect of the present invention.

The first aspect of the method of the invention comprises a dynamic agent staffing, or work force configuration, function. One of the first critical decisions that the invention performs is the determination of an enhanced agent work force configuration, as illustrated in FIG. 2. This enhanced work force configuration includes a number of force management variables, including number agent work groups, or teams (team configuration), a number of agents working within each team (team size), as well as a division of an individual agent's tour among various teams (agent tour), all determined utilizing the optimization techniques of the present invention. As discussed earlier, the invention utilizes fundamental network switching principles to organize the agent work force into multiple, hierarchically-arranged teams. Moreover, once the invention has organized the agent work group into a preliminary, default team organization, the invention continually and dynamically makes adjustments to the team configuration, the team size and the agent tour to ensure an agent work force configuration that is superior to a configuration that can be achieved utilizing previous methods.

In a preferred embodiment, the apparatus of the invention determines an enhanced work force configuration through a work force configuration means that is operational with an enhancement means. Referring again to FIG. 2, the work force configuration means evaluates estimated performance data and force management variables, such as a team configuration variable, a team size variable, and an agent tour variable to determine an initial enhanced work force configuration (steps 50, 60, and 70). The initial enhanced work force configuration includes a number of teams that are arranged in a hierarchy (step 75). Team configuration refers to the actual number of distinct agent teams in the work force. The work force configuration means utilizes the team configuration variable in conjunction with the enhancement means to determine a more efficient combination of distinct agent teams. Team size refers to the actual number of agents on a particular team at any point in time. The team size variable is used by the work force configuration means and the enhancement means to determine a more efficient team size for each of the distinct agent teams. Agent tour refers to the amount of time that an agent spends on a particular team or teams throughout the agent's work shift. The work force configuration means utilizes the agent tour variable in conjunction with the enhancement means to assign agents to a particular team or some combination of teams in a manner that better suits management's needs. The team configuration variable, the team size variable, and the agent tour variable are intended to represent all of those variables necessary in order to mathematically determine team configuration, team size, and agent tour at any point in time given a dynamically changing system.

One of the most important aspects of the work force configuration means is it's capability to dynamically adjust the overall number of teams, the number of agents within each team, as well as adjust an agent's tour utilizing the optimization techniques of the present invention. In other words, the work force configuration means is capable of monitoring and analyzing force management variables, call data and performance data to implement dynamic force management adjustments to the work force configuration to achieve a more efficient call center (steps 80 and 90). The agent tour functionality of the dynamic work force configuration capability allows the invention to split an agent's tour, or work shift, among any number of different teams at various points in time as well as to have an agent be a member of several different teams at the same time. As an example, an agent may be assigned to a team that is low in the hierarchical structure for the first fifteen minutes of a tour in order to educate himself about a new product or to be trained on a new operation method. During this same fifteen minute period in which the agent is a member of this final team, that same agent may also be an experienced agent who is also assigned to a Service Assistance Reserve Team. Once this fifteen minute period is completed, the agent then may he assigned to the primary team for the remainder of his tour, Or some portion thereof.

The work force configuration means of the apparatus is primarily responsible for gathering all the data necessary to determine the enhanced work force configuration. The work force configuration means is fully operational with the monitoring means, the input means, and the control means in gathering data. The work force configuration means interacts with the enhancement means to determine an enhanced team configuration, team size and agent tour given the offered load, presently monitored switch data, and management-specified service objectives. Therefore, the work force configuration means is capable of utilizing force management variables (such as service objectives, current number of teams, current agent team assignments and a predetermined delay time), call data (such as number of incoming calls and time in for those calls) and performance data (such as real time evaluations of system performance and estimated system performance), to determine team configuration and assignments.

The work force team configuration may consist of a combination of any number or combination of teams and team types. As illustrated herein, the core teams included in the enhanced work force team configuration consists include a primary team, a secondary team, a final team, and a service protection team. However, it should be appreciated that the work force team configuration may include any number of teams, and that this number can, and may, change throughout the day as a result of the constant monitoring of the work force team configuration variables.

All of the core teams described above are arranged in a hierarchical order. The primary team is the first team and is designed to handle the bulk of the incoming call traffic. In other words, substantially all of the incoming calls are initially directed toward the primary team. The goal of the invention's method is to maximize the call occupancy of the primary team by sending all, or substantially all, incoming calls from the queue to the primary team first until a predetermined threshold has been met. The invention, simply by offering all calls to a primary team forces the percent occupancy of the primary team to the maximum percent occupancy attainable given the physical limitation of the communications server, possibly approaching 100% occupancy. Once the primary team has achieved a predetermined threshold, calls overflow to the second level team. In other words, once the predetermined threshold is achieved, calls are redistributed toward the secondary team. The calls overflowing to the secondary team are not riandoom; all of the incoming call traffic to the secondary team is the result of calls overflowing from the primary team. Just as with the primary team, the invention sends calls from the queue to the secondary team until a predetermined threshold has been met. Once this threshold is met, calls are then redistributed to the next team, or the final team as described herein. Finally, if service reaches a critical level, i.e. if calls can not be distributed to the first three teams and handled by the agents within these teams within the service objective constraints, the invention will dynamically utilize agents from the service protection team. In other words, the service protection team may be established over and above the required teams to which calls flow only when customer service reaches a predetermined critical service level.

The primary function of the service protection team is twofold. First, the service protection team acts as a pressure relief on the system by eliminating regenerated calling attempts. Secondly, the percent occupancy of the service protection team is minimized in order to provide the service protection team agents with adequate educational and/or training time. This function is accomplished by reducing, or preferably eliminating, small increments of idle time in the primary, secondary and final teams, and accumulating it in the service protection team. This will allow the small, previously unusable bits of idle time, typically fractions of seconds to a few seconds in length, to be shifted to the agents in the service protection team. When this shift occurs, the agents in the service protection team will now have larger blocks of time to use for a secondary task that preferably has a company oriented purpose, such as training.

In addition to the core group of teams discussed above, the invention contemplates the use of any number of other auxiliary teams. Specifically, in order to reduce delays for a caller requiring a service assistant, a Service Assistance Reserve Team ("SART") may be created to handle overflow calls from the primary service assistants. A service assistant's function is to handle difficult customer calls as well as answer any agent questions. The SART members may be experienced agents from any of the core teams discussed above who are able to handle overflow service assistant calls from any team. In addition to the SART, an essential auxiliary team necessary for the distribution of calls to increase agent skill is the special skill team. This team is comprised of agents who possess various special call handling capabilities, such as foreign language expertise or knowledge about a particular product. The specific role of the special skill team will be discussed later. Understandably, other types of teams requiring generalized or specialized agent functions may be accommodated.

Returning now to the functionality of the present invention, once the enhanced team configuration has been determined, the invention has the capability of communicating team assignments to each individual agent through the agent terminal at the time of the agent log-in. As the invention dynamically alters the agent team assignments, the agent may also he notified of a new team assignment through some type of electronic communication delivered to the agent's terminal. However, in a preferred embodiment of the invention, there may he no need to communicate to the agent a specific team assignment and the agent may just handle calls as they are distributed to the agent position without having any specific knowledge of a particular team assignment.

Figure 3:
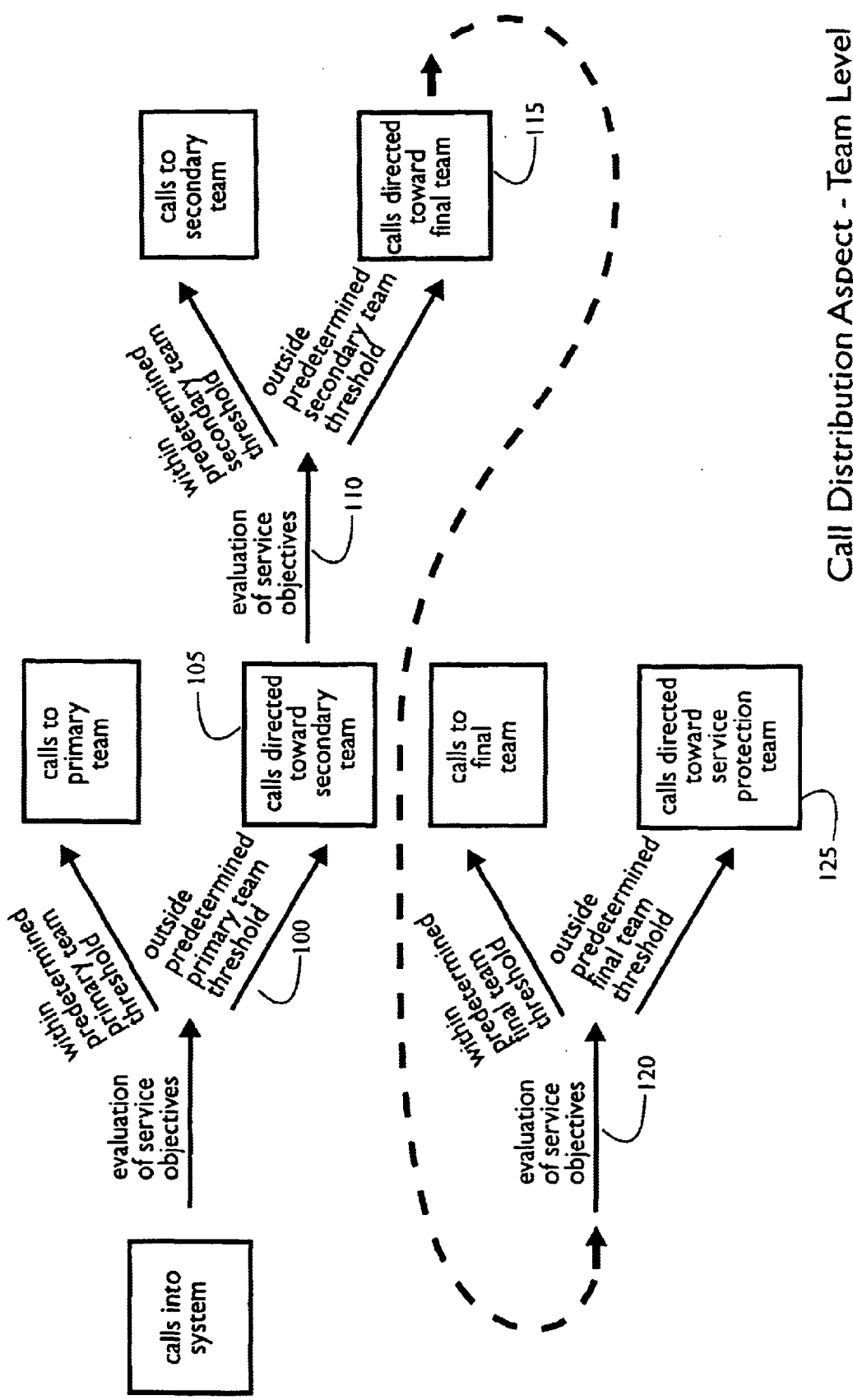
FIG. 3 is a flow chart of the call distribution aspect of the present invention.

In addition to the enhanced agent work force configuration aspect, the present invention includes a call distribution aspect, as illustrated in FIG. 3. Once the invention has determined the initial default team configuration and the agents are logged-on, the calls are distributed to the various teams according to an initial team call distribution methodology. This initial team call distribution methodology distributes calls from the queue to the default team configuration according to required, fundamental team call distribution principles. Generally, in a preferred embodiment of the invention there are two basic rules that must be met with respect to the initial team call distribution. The first rule is to distribute all calls to the primary team until all agents are occupied and the service objectives are met, i.e. until some predetermined threshold is met. The second rule is that once the predetermined service level thresholds are met in the primary team, calls must overflow to a secondary team.

Under the team call distribution methodology of the present invention, all calls are initially sent to the primary team queue. In a preferred embodiment, the only idle time is the switch interval between calls. As the percent occupancy of the primary team increases, the queue continues to develop. As this queue grows, the invention continuously monitors the various service objectives associated with the calls in queue. For example, the invention will monitor performance data such as the average delay and the percent abandon to ensure that one or both of these values is within the service objective level The invention will maintain service levels precisely at predetermined levels. As an example, management may have set the following service objectives as constraints on the system when providing the force management variables for system operation: a maximum five second average delay and/or a maximum four percent abandon. The call distribution means will continue to send calls from the queue to the primary team under the team call distribution rules until the service objective thresholds are met.

Once the invention has monitored the service levels to ensure that the service objectives are being met, the invention will begin to distribute calls from the queue toward the final team, or to the secondary team as described herein. In a preferred embodiment, calls overflow to the secondary team when the primary team is operating at or near maximum percent occupancy. Most or all of the time, the secondary team will typically look a lot like the primary team. The percent occupancy of the secondary team may generally be in the range of 80–90%.

The invention creates the overflow mechanism by creating a 'threshold' delay between the primary team and the secondary team, thereby forcing all calls to spend at least some time in queue or delayed. It is important to note that the invention does not attempt to create perfect service, namely a zero second delay. The invention operates in conjunction with the enhancement means to adjust the level of threshold delay between the primary team and the secondary team to meet either the percent occupancy constraint or the service objective constraint. A delay threshold introduced between the various teams acts like a dam causing the incoming calls to remain in queue until the threshold is reached. This delay controls the occupancy of a team since the automatic call distributor will not offer the call to the next team until the threshold is reached. For instance, if the threshold provided by management allows for a maximum delay of five seconds, the calls will be directed toward the final team once that predetermined delay time is reached.

In a preferred embodiment, there are at least four distinct agent teams arranged in a hierarchical order. When the service objective is met, calls overflow to the next team in the hierarchy. In other words, the present invention will determine, in real time, a period of time in which a call should be answered to meet the service objectives and calls will begin to overflow toward the next team once they are no longer being answered within this predetermined period of time. In the example described herein and illustrated in FIG. 3, calls overflow from the primary team to the secondary team if they are not being answered within the first predetermined period of time, as determined for the primary team (steps 100, 105). The present invention will continue to monitor the service objectives and determine a threshold delay for the secondary team (step 110). When calls directed to the secondary team are no longer being answered within this second predetermined period of time, they will be redistributed to the final team (step 115).

When the invention determines that service has again reached a critical level, agents from the service protection team will be utilized to handle these critical calls (steps 120, 125). One important point to remember is that under a preferred embodiment, members of the service protection team are engaged in training and or educational activities during their tour. When the service objective is met in the final team and a call needs to overflow to the service protection team, the invention reassigns a single agent from the service protection team and places this agent temporarily in the primary team, or some other team, to handle a particular call. The invention maintains constant pressure on the primary team, and correspondingly, on the secondary and final teams. It relieves the pressure by lowering the delay threshold or by adding the service protection team agents to the primary team, or some other team, one agent at a time.

In addition to routing calls to a particular team, the above distribution methodology is utilized by the present invention to distribute calls to a particular agent within a team through the call distribution means. The invention distributes calls in a hierarchical fashion, with rules governing the distribution of calls to a particular team generally taking priority over the distribution of calls to a particular agent within a team. The call distribution means, in operation with the enhancement means, utilizes force management variables such as a team distribution variable and an agent distribution variable as the primary decision variables in making call distribution decisions. The team distribution variable and the agent distribution variable are intended to represent all of those variables necessary in order to mathematically improve both call distribution to a particular team as well as to a particular agent within a team at any point in time given a dynamically changing system, respectively.

The agent distribution variable represents at least two distinct types of sub-variables, including an agent cost call distribution variable and an agent skill call distribution variable. The agent cost call distribution variable is intended to represent all of those variables necessary in order to mathematically improve the distribution of calls to a particular agent based on some type of cost factor. The agent skill call distribution variable is intended to represent all of those variables necessary in order to mathematically improve the distribution of calls to a particular agent based on some type of skill factor. Additionally, the call distribution means is fully operational with existing call management systems and may make use of individual call agent performance data stored in various locations within the existing call center management system. The types of data that the invention may utilize include: agent skill profiles; agent cost profiles; agent education and training records, among many others. It is important to note that the invention is capable of interacting with existing systems that store this type of data or is equally as capable of having this type of data made available to the invention in some other manner.

The call distribution means, operating in conjunction with the enhancement means, utilizes the agent cost call distribution variable to select a particular agent to handle a call in an improved manner based on minimizing agent variable costs. In a preferred embodiment, the function of the agent cost call distribution is to distribute calls in such a manner as to minimize the total variable agent costs of an entire team. Correspondingly, in order to determine the agent variable costs for an entire team, it is necessary for the invention to monitor some type of individual agent cost profile or calculate some type of individual agent cost factor. In a preferred embodiment of the invention, the invention calculates and continually updates a specific type of cost factor for each agent. The cost factor that this invention preferably calculates is an individual agent cost per standard work minute factor.

In order to calculate the agent cost per standard work minute, the invention must monitor certain key elements of the agent's work. Specifically, the invention may monitor and record for each agent the number of calls each agent handled as well as the average work time for the calls handled by each agent. The invention may also monitor any number of other variables associated with the variable cost of an individual agent.

The invention also calculates for any given period of time a standard work time. Additionally, the invention preferably interacts with some type of agent payroll database in order to retrieve the agent's variable cost figure. From the above numbers the invention will calculate for each individual agent a cost per standard work minute. This figure may also be continually updated as the agent works and the agent handles more calls, each of varying work times.

Once the invention has calculated an initial cost per standard work minute for each agent, or some other type of appropriate cost factor, the invention is capable of distributing calls to the agents in some cost minimizing fashion. In a preferred embodiment, the agents are ordered in the queue for their assigned team in a manner that most effectively minimizes the overall cost of the agent' assigned team. It is important to note that, as with other aspects of the work force configuration, the ordered cost queue for any team is continually changing because an agent may be dynamically reassigned to a different team at any point in time and the agent's individual cost per standard work minute is continually changing.

Returning to the agent distribution variable, in addition to improving the agent call distribution function by minimizing the variable costs associated with agent labor, the invention is further capable of improving the agent skill call distribution variable by maximizing agent utility. Existing skill-based call distribution systems typically identify callers as requiring an agent with a particular skill either through a decision tree process that the caller must navigate prior to being connected to an agent or by some automatic means such as an originating trunk, originating number or called number identification. Although this invention may be fully operational with existing skill-based r outing methods, the present invention makes an advance over existing methods by utilizing a dynamic agent special skill team to improve the matching of agents possessing particular abilities with calls requiring special skills. For instance, the present system could prompt a caller to say a key word for voice recognition, such as fire or medical, and, if appropriate, the caller could be routed to the service protection team for immediate response. Because the system is capable of continuously monitoring and configuring the composition of the teams, the present invention can ensure that there is always an agent available in the service protection team who is qualified to respond to all foreseeable situations.

As discussed earlier, the invention is capable of determining an enhanced work force configuration by dynamically adjusting the team configuration, the team size and the agent tours. This capability allows the invention to create various auxiliary teams in addition to the core teams described above. One such auxiliary team may he a special skill-based team comprised of a configuration of agents possessing various special skills.

In contrast to other methods, this invention identifies the skill after the customer has reached a regular primary team or secondary team agent. Once the call has been identified by a primary team or secondary team agent as requiring a special skill, the agent identifies that call as requiring a particular skill. Such identification may occur by the agent typing in a particular code for that call or depressing a particular key associated with the agent terminal. Once thus identified, the call is sent to a special skill call queue. This skill call queue is unique from all of the other team queues and may be served only by agents of the special skill team.

Whereas prior art systems attempted to search all available agent positions for an appropriately skilled agent that matches the required skill of the call, this invention utilizes an intelligent agent position which allows the skilled agent to search all of the calls in the skill call queue. Utilizing this 'intelligent' agent position, an agent of the special skill team, either manually, or in a preferred embodiment, automatically, searches the skill call queue for a call requiring the particular skill that the agent possesses. Each 'intelligent' agent position possesses the minimum capability of requesting that a particular call be directed to that particular agent position if an appropriate skill match is found.

The invention enhances this skill-based distribution by utilizing the agent skill call distribution variable in conjunction with the enhancement means to determine the most appropriate configuration of the special skill team. For example, the invention is capable of monitoring the trends for the day in real time, as well as for distinct time periods, and is capable of determining the number and types of both skills and agents that the special skill team should possess in an effort to maximize the likelihood that a skilled call will match the abilities of an agent on the special skill team.

In addition to routing calls that require some type of special assistance, the invention allows the agent to identify a call that has been delayed for a significant period of time, such as for more than a predetermined amount of time as input by system management, to be routed to a special agent or team. Moreover, because the invention has the capability of dynamically adjusting an agent's function and agent's team at any time, the invention allows an agent's tour to be split between any number of teams and or functions, as discussed above. As an example of how the split tour capability may affect the skill-based distribution, one type of call handling agent, a call handling agent for a home shopping network could read, study or train on the new sale items for that day while simultaneously belonging to the special skill team. As discussed earlier, the final team members preferably utilize their idle time for a secondary task that is beneficial to the company, such as training or education. However, when service reaches a critical predetermined threshold, the agent would be notified of a critical service call, perhaps a call requiring a special skill, and the agent would temporarily be removed from the training and education function to handle that particular call.

Therefore, the present system can utilize the accumulated time from the final team, or the service protection team, to add immediate resources to meet increased call volume or short periods of peaked calls. This immediate force adjustment, the addition of a number of agents to the primary team, can maintain service objectives and reduce or eliminate customer regenerated attempts. Moreover, once the portion of the agent's tour in which the agent belongs to the final team is over, the agent may be reassigned to a new agent team.

A third aspect of the present invention is a method for improving both the work force configuration aspect and the call distribution aspect of the invention, or the enhancement means itself. The invention utilizes an algorithm to improve mathematical relationships among a number of variables in both the work force configuration and the call distribution aspects.

Fundamentally, the system which the algorithm controls is a stochastic process. A stochastic process is one in which one or more of the random variables takes on values according to some, perhaps unknown, probability distribution. In the system model of a preferred embodiment of this invention, both the precise number of calls arriving and the time it takes to process that call by an agent are random. Moreover, the incoming calls generally arrive according to a known probability distribution, the Poisson distribution.

Multistage stochastic programming problems, including telecommunication queuing and network problems, are often appropriately modeled where uncertain parameters with known probability distributions are introduced.

Stochastic modeling is complex, typically involving large optimization problems utilizing multiple input data and offering solution arrays that are large and difficult to analyze. In the present invention, decisions concerning the hierarchical configuration and dynamic forcing of the various teams as well as the distribution of calls to both teams and agents require decision making under a fairly complex level of uncertainty. A stochastic decision-making model allows decisions to be made precisely under this type of uncertainty.

One approach to solving the type of algorithm required by the invention is to utilize current state of the art stochastic modeling optimization software to solve for the various scenarios imposed by the algorithm. As an example, the IBM Stochastic Solutions software suite implements the Stochastic Mathematical Programming System (SMPS) to build and solve this type of mathematical algorithm. In particular, stochastic programming models are well suited to capture both the dynamic and the stochastic aspects of decision problems.

In order to better understand the mathematical relationships involved in the invention's optimization algorithm, a generalized model of the call distribution and agent forcing system should he discussed. In a preferred embodiment of this invention, the system with which the present invention is concerned is composed of a number of elements. Perhaps the most critical component of this system is the offered load. The offered load is calculated by multiplying the number of arriving calls by the average work time for each of those calls. Among the variables that may be used to calculate the offered load include: the number of estimated incoming calls; the estimated all mix; and the estimated average work time (AWT) for each call. In addition to the offered load, other critical elements of the present system include the carried load, the overall team configuration, the dynamic individual team configuration, the dynamic threshold delays between teams, the service objectives, individual agent cost and skill profiles, and the physical limitations of the call distributor, among many others.

The optimization algorithm utilizes information and monitored data concerning each of the above system components in conjunction with several general operating principles. Generally, the goals of the present invention include maximizing occupancy of the primary team, overflowing calls toward the final team, completing the calls to a final team, and utilizing idle time in such a manner that the idle time is available to agents in the final team for training and education. Moreover, the optimization algorithm utilizes the optimization techniques of the present invention to improve the above functions by dynamically adjusting team configuration, team size, and threshold delays.

Preferably, the following formulas are among those utilized by the optimization algorithm of the present invention.

Calls per second=offered calls/total number of seconds

Carried calls per second=carried calls/total number of seconds

Offered work load=offered calls * AWT

Carried work volume=carried calls * AWT

ACT AWT=Carried work volume/carried calls

ACHT=AWT—Positions in Make Busy

Abandoned calls=offered calls—carried calls

Percent queue abandoned=abandoned calls/calls in queue

Average delay=Call seconds in queue/calls in queue

Call seconds in queue=Average delay * calls in queue

Occupancy=actual agents * total number of seconds—total available work second/carried work load Calls in queue=call seconds in queue/average delay Variables having given values, or those derived from force tables include offered calls, carried calls, blocked calls, required agents and actual agents.

Those skilled in the art of stochastic model programming will readily appreciate that a system model for a preferred embodiment of this invention may be written as follows: Given the system described above, the problem is to enhance the matching of offered load with carried load, by choice of the dynamic arrangement of agents into hierarchical service teams and/or by the dynamic adjustment of threshold delays between the various teams, subject to a set of pre-determined service objectives. This occurs by minimizing the various costs associated with handling the call or by maximizing the utility of a particular agent, or some combination of both.

The constraints establish the bounds within which the improvement must occur by restricting the values that can he assumed by the variables of this system. The constraints of the system model in a preferred embodiment include both rigid and soft constraints. Rigid constraints are most often associated with physical variables and always must be satisfied. Soft constraints are those constraints that are negotiable to some degree and are typically expressed as goals that are associated with target values. In a preferred system model of the present invention, the primary rigid constraints are those restraints imposed by the physical limitations of the communications server. Specifically, a No. 5ESS automatic call distributing switch operates at a maximum of 98.5% call occupancy due to the switch or server delay interval between calls.

In contrast to the rigid constraints, the preferred system model possesses any number of soft constraints. Among the most important soft constraints are the variables associated with the service objectives. As discussed above, there can be any number of system variables that management may utilize to define a service objective; however, two of the most important include the average delay and the percent abandon.

The present invention also makes a significant advance over current systems through its ability to dynamically monitor dual service objectives. For example, management might have provided force management variables including a service objective of no more than a ten second delay or three and one half percent abandon. The invention can accommodate this type of service objective. If the average answer ranges from eleven to fifteen seconds, but customers are abandoning at only two and one half percent, the invention may or may not take any action, depending on how management has specified that the invention to handle this type of scenario. In fact, the invention could make the team more efficient by taking people from one of the teams. Moreover, the present invention will allow management to specify different service levels for different teams. For example, any call directed to the service protection team, where the call occupancy is very low, could receive instant service with no delay.

Returning to the enhancement means, both the team configuration means and the call distribution means interact with this critical aspect of the present invention to enhance the decision making process. The enhancement means utilizes optimization techniques to solve any number of mathematical relationships between and among any number of system variables through the use of the invention's apparatus which is fully operational with existing stochastic modeling software, as discussed above.

Given the constraints of the system, including management specified service objectives, the enhancement means utilizes any number of tools to control various aspects of the system. Specifically, these tools represent the decision variables, or force management variables, for the system and include a team configuration enhancement means, a team size enhancement means, an agent tout enhancement means, a threshold delay means, a delay announcement means, and a team call distribution enhancement means, including both an agent cost enhancement means and an agent skill enhancement means.

Perhaps the most critical functionality that the enhancement means possesses is the ability to dynamically adjust the agent work force configuration in real time to achieve an enhanced team configuration. Once an initial team configuration is established, discussed above, the invention will continuously monitor and evaluate switch data to dynamically alter the number of teams as well as the number of agents within each team. With the multiple data available to the invention, the enhancement means will determine an enhanced team configuration at any given point in time and make team configuration and team size adjustments as necessary.

In addition to work force configuration improvement achieved by determining a number of teams and a size for each team that better meet management's needs, the enhancement means utilizes both a threshold delay means and a delay announcement means to improve service levels.

One of the primary tools that the enhancement means utilizes in controlling service levels is threshold delays. The optimization algorithm will introduce and dynamically adjust threshold delays between the various teams to ensure that a particular team is operating within certain service objectives. As discussed earlier, the threshold delays serve at least two vital purposes. First, the introduction of a threshold delay creates the overflow mechanism by which calls from a higher-ordered team overflow to a lesser-ordered team. Specifically, a delay threshold introduced between various teams acts much like a dam and causes the incoming calls to remain in queue until some predetermined condition or threshold has been reached. In addition to being primarily responsible for creating the overflow mechanism, the threshold delays are also responsible for providing the enhancement means with a tool to control the service objectives at any given point in time. For example, management may have specified as acceptable constraints on the system the following service objectives: an average delay less than five seconds and/or a percent abandon value less than ten percent. With the established service objectives as constraints, the invention will continuously monitor the call switch data and will utilize threshold delays to ensure that the invention operates within the specified service objectives. Therefore, in addition to determining team assignments as a function of this predetermined service level, the present invention will also determine the threshold delay as a function of the same. It is important to note that the invention does not attempt to create perfect service, namely a zero second delay or a zero percent abandon. Rather, the invention will continuously and dynamically adjust the threshold delays between teams as required in such a manner as to always satisfy the service objectives.

In addition to the optimization techniques described above, the present invention can preferably provide real time and time period expert queue analysis of load service factors that impact the service objective. In other words, the system of the present invention could determine if the service objectives are being met, or why they are not being met, by evaluating any number of factors, and then report this performance data back to management. The results of this analysis could be made available for any period of time, summarized for tours or the entire day. Examples of factors that could be considered in this assessment could be evaluation of offered load characteristics, such as was it within the estimate or over it. Other factors that could be considered include level of required agents, position of scheduled agents, positions that were occupied by made busy, non-random AWT with a predetermined percentage of long duration calls, AWT call distribution within the objective, and agents logged in late/logged off early. Still other factors that could be considered include percentage of regenerated attempts, positions on-line with no calls completed, time period calls no random, number/percent of customers that abandoned calls when agents were available, calls delayed with an increase in AWT because of an ARU problem, and number of agents on-line as a service assistant.

Preferably, the present invention provides a force manager with a powerful tool for unit cost determination. The system of the present invention can determine a unit cost for operation that is based on such factors as actual individual agent wages, team productivity, desired service objectives or other force management provided variables. For instance, if a force manager would like to determine what service objectives could be met at a desired unit cost, the present invention could evaluate applicable force management variables and make this determination. Similarly, a force manager could have the present invention calculate the unit cost that would be required to meet certain service of jetties. It should be appreciated that this aspect of the present invention will allow for real time calculation Of unit cost and future cost projected for a multitude of permutations of variables. Therefore, it should be appreciated that the present invention can help managers determine the best-fit solution for service based on the variables that they feel should be evaluated. This will allow the present invention to help managers control and enhance future call center service in addition to continuously enhancing real-time service. In addition, management can utilize this aspect to measure least cost service by evaluating individual performance of agents.

Another optimization technique carried out by the enhancement means is the use of a delay announcement means. By providing a caller with an indication of the volume of calls that are incoming at that time, it is believed that the number of regenerated attempts can be reduced. The delay announcement means is preferably capable of dynamically deciding when to activate a delay announcement to the calling customer as well as determining which type of delay announcement should be given, if multiple delay announcements are desired by the managers. For instance, when the offered load for a team exceeds that team's capacity, the delay announcement means could determine the type of customer announcement to be given to those callers with calls waiting in the queue.

Preferably, the delay announcement means is capable of offering at least three distinct delay announcements, each with a unique purpose. Delay announcement one would be a message announcing to the customer some variant of the following: "I'm sorry, your call will be delayed (x seconds?)". The purpose of this message is to inform the calling customer of a possible delay in answering the call and this delay announcement may be related to the introduction of a threshold delay by the algorithm. Delay announcement two would be an announcement such as: "I'm sorry, your call will be delayed. Please place your call later." The purpose of this announcement is to attempt to influence the calling customer to hang up voluntarily, thereby reducing regenerated attempts. Finally, delay announcement three would be an announcement similar to: "I'm sorry, we are experiencing unusually heavy calling." Immediately following this announcement, the call would automatically be dropped from queue. It should be appreciated that the impact that use of these announcements had on service, or the percent of regenerated attempts that occurred even with the use of these announcements could also be included in an expert queue analysis report.

In addition to the basic operation described above, the delay announcement means of the present invention preferably performs one or more supplemental tasks. For instance, the delay announcement means could instruct the caller to give a one or two word indication of the nature of the call, such as urgent or fire. This modification would find particular application for use with an emergency call center. In this application, a caller could give a brief summary of the nature of their call. A voice recognition unit could monitor responses by callers and this information could be relayed to the control means to determine if the call was of a nature that a delay message was necessary, or if the call should be sent to the final team or some other team, such as a service protection team. In addition, the delay announcement means also preferably possesses the capability to indicate to the agent that a particular customer has been given a delay message while waiting in queue. Further, by the time a call has been delivered to a final team it may have been delayed for 30, 40, 50, 60 seconds, etc. Therefore, the delay announcement means is preferably able to provide a regret-delay message to the calling customer. For example, after a certain number of seconds or minutes waiting for a call attendant answer, the delay announcement means could provide a brief "I'm sorry you had to wait" type message just before connecting the call to a final team or a service protection team.

Figure 4:
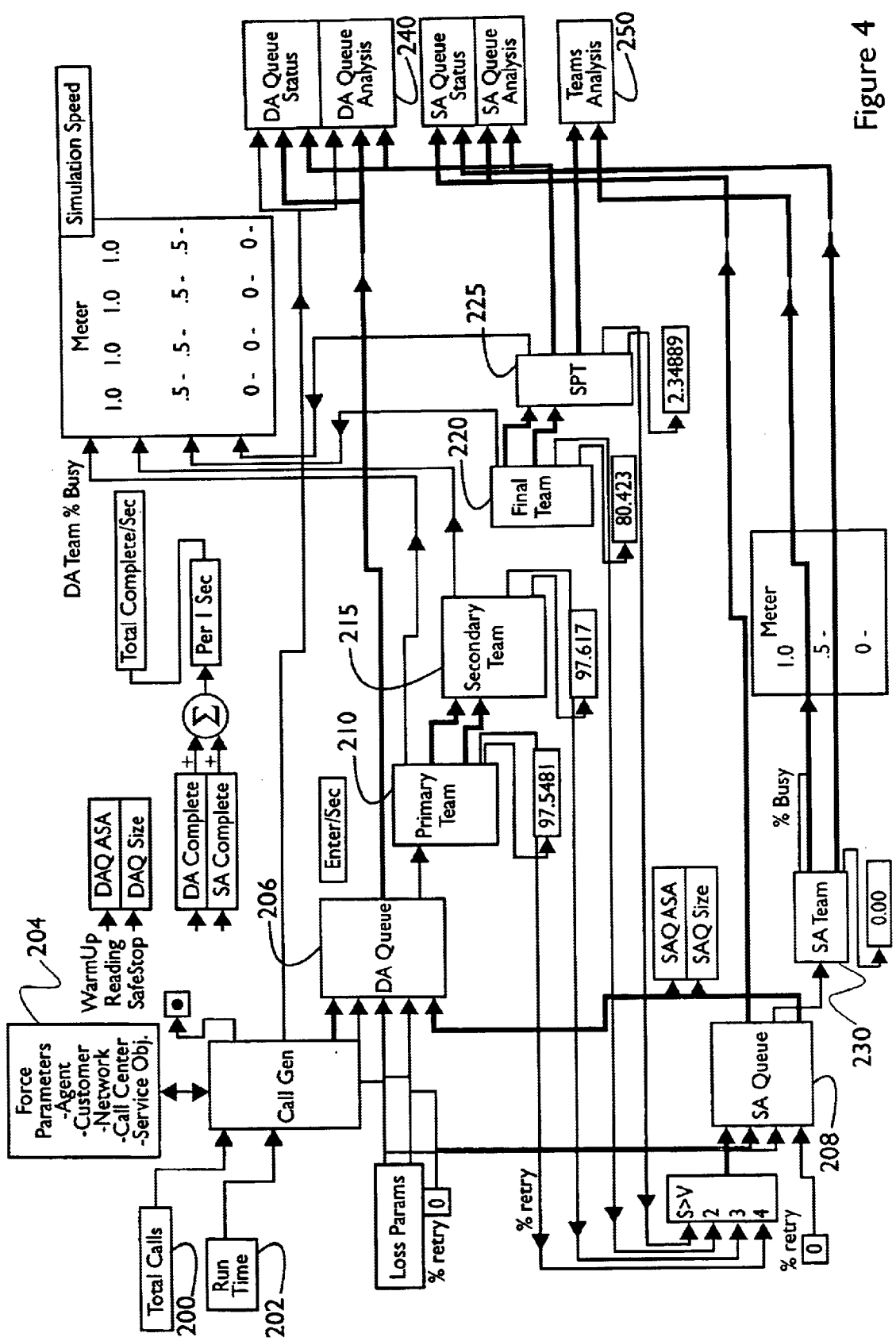
FIG. 4 is a flow chart outlining a simulation of the present invention.

Referring now to FIG. 4, there is illustrated a flow chart outlining a simulation of the present invention. As illustrated, calls generated is a function of the total calls into the system 200 and the run time 202. In addition, force parameters 204 regarding agents, customers, the network, the call center and the service objectives influence the manner in which the calls generated are handled. In the simulation represented by FIG. 4, a primary team 210, a secondary team 215, a final team 220 and a service protection team 225 are each capable of receiving calls from a default queue 206. A special assistance team 230 is also included and is capable of receiving calls from a special assistance queue 208. As illustrated, special assistance queue 208 could receive both directly incoming calls and those calls forwarded from primary team 210, secondary team 215, final team 220 and service protection team 225. However, to simplify the simulation, no calls were forwarded to special assistance team 230 from teams 210, 215, 220 and 225, nor did it receive any incoming calls directly. Further, because no calls were to be directed to special assistance team 230, no agents were assigned to it.

For the simulation, 250 agents were assigned to primary team 210, thirty agents to secondary team 215, fifteen agents to final team 220 and five agents were assigned to service protection team 225. A zero second threshold delay was initially set for call overflow from primary team 210 into secondary team 215, a twenty second threshold delay was set for call overflow from secondary team 215 into final team 220, and an eight second threshold delay was set for call overflow from final team 220 into service protection team 225. The simulation was performed over a period of fifteen minutes, and 11300 calls were received during this time. By utilizing the present invention to dynamically configure the work force composition and to monitor the service objectives, the present invention allowed primary team 210 to perform at an average percent occupancy of 97.5431 and secondary team 215 to perform at an average percent occupancy of 97.617. Notice that virtually all of the idle, unproductive hits of time have therefore been removed from these teams. However, notice that final team 220 performed at an average percent occupancy of 80.423, indicating that an amount of the unusable bits of idle time was shifted to these agents. Because this idle time was shifted, there is a higher likelihood that agents in this group could perform secondary tasks that could benefit the company, such as training. Finally, use of the present invention created a 2.34889 average percent occupancy in service protection team 225, indicating that a majority of the idle time for the simulation time period was shifted to the agents in this team. It should be appreciated that because these agents were needed for such a small amount of the simulation period, they could spend the majority of their time for some secondary purpose that could benefit the company.

Figure 5:
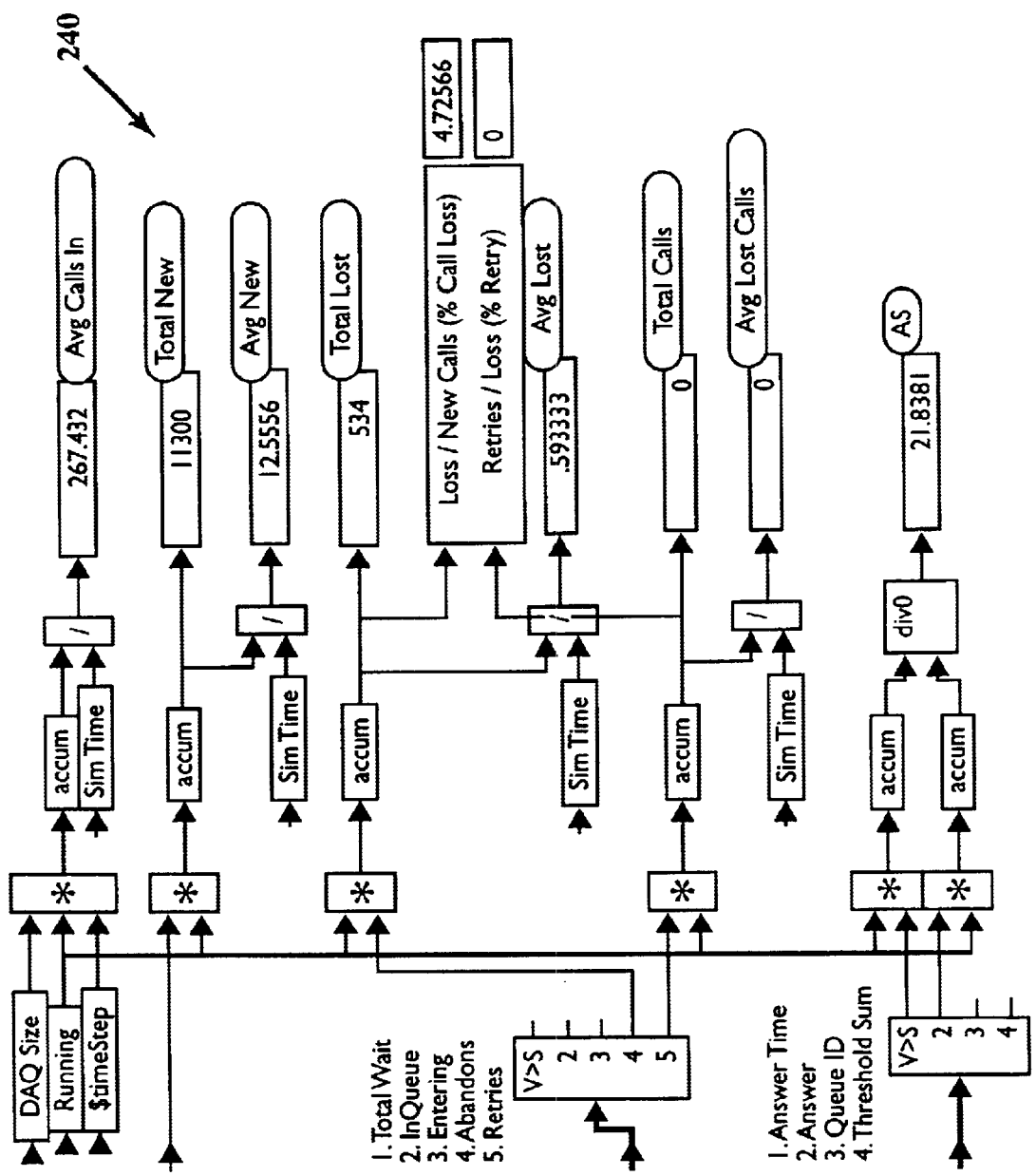
FIG. 5 is a flow chart outlining a queue analysis for the primary, secondary, final and service protection teams for the simulation of FIG. 4.
Figure 6:
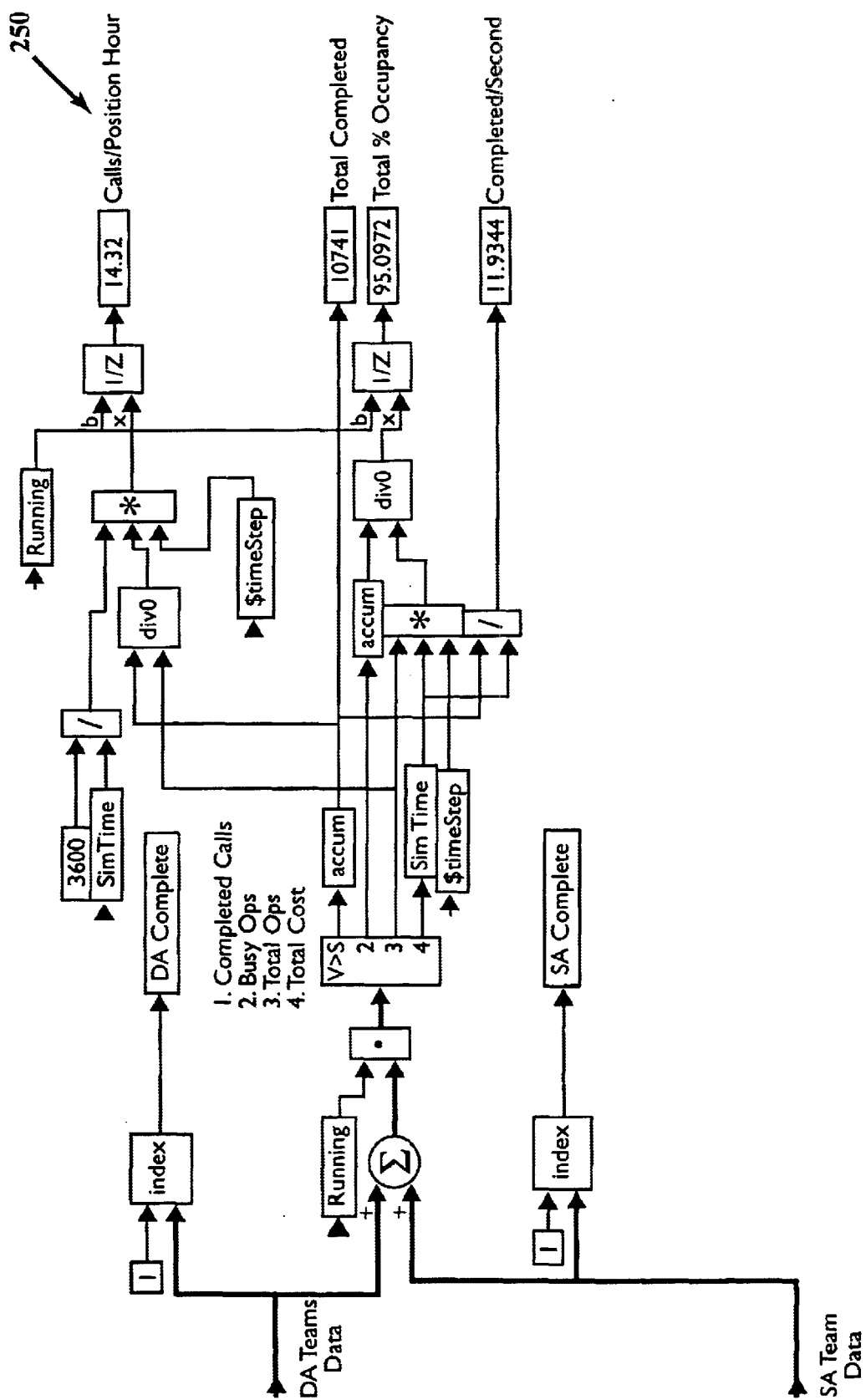
FIG. 6 is a flow chart outlining team analysis for the primary, secondary, final and service protection teams for the simulation of FIG. 4.

As indicated previously, the present invention is also capable of providing a queue analysis, such as default queue analysis 240, and a teams analysis 250, and these have been provided as FIGS. 5 and 6, respectively. Referring to FIG. 5, it can he seen that the total number of lost calls for the simulation period was 534. The percent lost calls, or the number of lost calls per number of new calls, therefore, was 4.72566. In addition, FIG. 5 shows that the average lost calls was 0.593333. Referring to FIG. 6, the teams analysis, use of the present invention yielded a total percent occupancy for the system of 95.0972.

It should be appreciated that various modifications could be made to the present invention. For instance, the apparatus could include a device to monitor and record the originating number for callers who waited for a predetermined amount of time and then hung up. A service protection team agent could then call these callers back during a non-peak time with an apology. In addition, the present invention could be modified to include a means for tracking how many attempts to reach the call center originated from each phone number. Once again, this information could be provided to a member of the service protection team, who Could call back with an apology. This data could be used to determine how many callers attempted to reach the call center multiple times before they were successful, or if they were successful. Further, the present invention could include a means for determining the effectiveness of the delay announcements in light of their goals, i.e. reducing the number of regenerated attempts. For instance, the system could track the number of regenerated attempts that occurred as a result of a caller receiving one of the delay announcements. Call center management could then determine if the wording or number of delay announcements should be changed.

In addition to the modifications illuminated above, the present invention could be used to maintain the number of abandoned calls below a predetermined number, such as 60,000, which would require management to file an FCC report. The present system could determine a number of calls route to the service protection team during peak times which would reduce the number of abandoned calls. The service protection team agents could be alerted, by a visual screen or other means, that this caller should be given a short announcement, such as "I'm sorry but we are experiencing technical problems, please place you call later." The agent could then position disconnect. In this manner, the present invention could help call centers work toward eliminating calls which received no service and allow live agents to screen calls for those that are urgent or require immediate assistance.

Further modifications to the present invention could include providing a means for identifying the origin of each call. When the present invention recognized a call that originated from the location from which a previously abandoned call originated, that call could he routed to a special team. The special team agent could then be informed, prior to answering the call, that the caller had attempted to call the center previously but had abandoned that attempt.

It should be appreciated that the present invention provides a number of advantages over previous call distribution methodologies. For instance, whereas current force management processes attempt to make corrective adjustments after the event, the present invention makes corrective adjustments in real-time. In addition, these adjustments are made utilizing the optimization techniques of the present invention to yield an enhanced force management decision. Included in these real-time adjustments are dynamic modifications to team configurations, including number of teams, number of agents within each team and identity of agents assigned to each team. In addition, the present invention is capable of making real-time modifications to the threshold delay and other service objectives throughout the operational period. Therefore, if the managers have determined that a greater threshold delay is acceptable during peak times, the present invention can take this input into consideration when operating the system. Because the present system disclosed herein can dynamically configure the call response teams, the present invention can better achieve near maximum efficiency of the primary team or teams than could previous systems. Therefore, because the present invention is capable of dynamically monitoring data, determining corrective actions, and then implementing these corrective actions, the present invention can enhance the service previously provided by large call centers.

One of the greatest advantages obtained under this invention in contrast to existing call distribution and agent forcing systems is the elimination of regenerated attempts. Regenerated attempts are created by callers who have experienced a delay in reaching an agent that is significant enough for the caller to hall up, or abandon the call, and try re-connecting with the agent. One of the greatest concerns with regenerated attempts is that regenerated attempts may lead to a process becoming increasingly more and more out of control. For example, if the service levels for a particular call handling period reach a critical level and callers are abandoning their efforts to reach agent assistance, a certain, statistically-proven number of these callers will attempt to reach an agent for assistance immediately after hanging up. These types of calls are termed regenerated attempts and they are not random calls; rather, they are directly correlated with the number of callers who abandoned their efforts in the prior time period. These regenerated attempts are then placed in queue with the normal expected offered calls, thereby greatly increasing the total number of calls far beyond the number of calls originally estimated to an agent or group of agents to handle. This increase in call traffic further exacerbates the situation that originally created the regenerated attempts. The same group of agents are now attempting to handle even more calls; the service levels deteriorate even more; and even more callers are abandoning their efforts and trying to reconnect with an agent, thereby further increasing the regenerated attempts. However, by dynamically moving an agent to one of the core teams, such as the primary or secondary team, at the right moment, the number of regenerated attempts can be reduced, thus making the call center more efficient.

In addition to these advantages, it should be appreciated that the present invention will give force managers the ability to maintain a consistent level of service despite peaks of unanticipated high or low call periods because of the dynamic adjustments to the system configurations. This aspect of the present invention will dramatically reduce instances of service deterioration that can result from non-random call volume fluctuations. Further, because the present system is capable of dynamic reconfiguration of team configurations, regenerated attempts can be significantly reduced.

What is claimed is:

1. A method of operating a call center, comprising the steps of:

forcing idle time into usable increments for a final agent team in a hierarchy of agent teams;

the forcing step includes a step of intentionally delaying a portion of incoming calls an amount of time that is less than a service objective delay time while an agent of the final agent team is available;

monitoring, in real time, an average call delay time and percentage of abandoned calls;

dynamically adjusting at least one of;
   a number of agent teams in a hierarchy of agent teams;
   a number of agents assigned to each agent team;
   a number of calls intentionally delayed; and
   a duration of an intentional delay;

performing the dynamically adjusting step at least in part in response to chances in at least one of the monitored average call delay time and the monitored percentage of abandoned calls.

2. The method of claim 1 wherein the performing step includes a step performing the dynamically adjusting step based at least in part on carried load and at least one of offered load, ACD server delay, agent cost characteristics, agent work time profile, service objective delay time, service objective percent abandon, and regenerated attempt quantity.

3. The method of claim 1 including the steps of:

changing at least one of a magnitude of an agent team quantity adjustment, an agent reassignment adjustment, an intentional delay adjustment;

determining changes in at least one of average delay time and percent abandon in response to the changing step.

* * * * *

UNITED STATES PATENT AND TRADEMARK OFFICE
CERTIFICATE OF CORRECTION

PATENT NO.     : 6,639,982 B1
DATED          : October 28, 2003
INVENTOR(S)    : Robert Stuart et al.

It is certified that error appears in the above-identified patent and that said Letters Patent is hereby corrected as shown below:

<u>Column 22,</u>
Line 42, delete the word "chances", and replace it with the word -- changes --.

Signed and Sealed this

Thirtieth Day of December, 2003

JAMES E. ROGAN
*Director of the United States Patent and Trademark Office*